Figure 1:
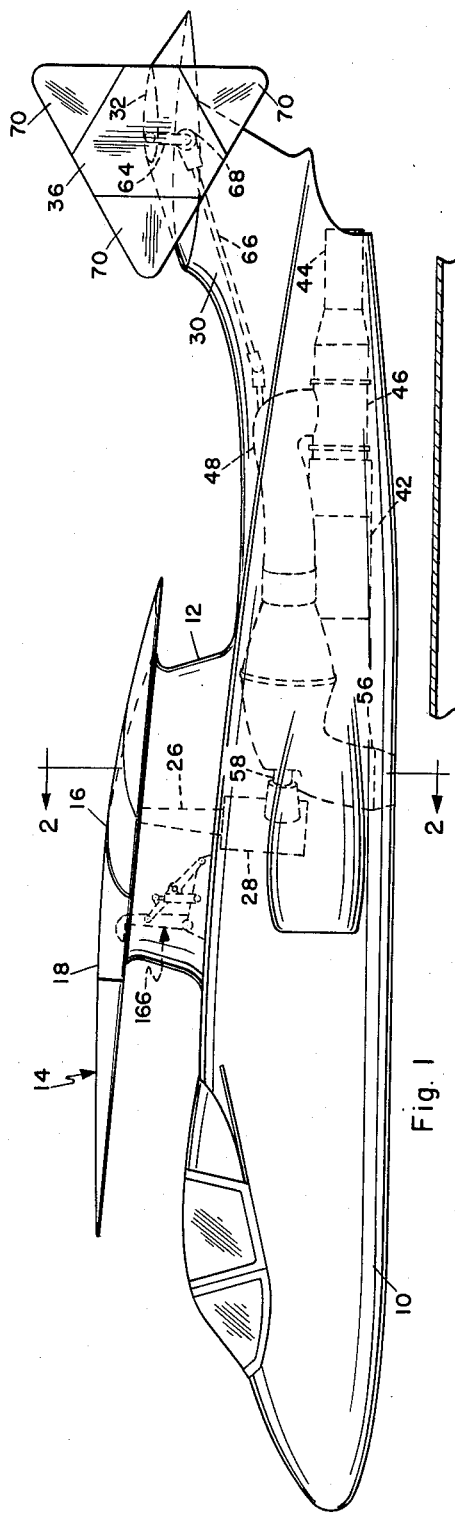

Sept. 1, 1964

P. F. GIRARD 3,146,970

HELIPLANE

Filed July 1, 1963

5 Sheets-Sheet 1

INVENTOR.
PETER F. GIRARD
BY
*Knox & Knox*

Sept. 1, 1964 P. F. GIRARD 3,146,970
HELIPLANE
Filed July 1, 1963 5 Sheets-Sheet 3

INVENTOR.
PETER F. GIRARD
BY Knox & Knox

Sept. 1, 1964  P. F. GIRARD  3,146,970
HELIPLANE
Filed July 1, 1963  5 Sheets-Sheet 4

INVENTOR.
PETER F. GIRARD
BY
Knox & Knox

Sept. 1, 1964 P. F. GIRARD 3,146,970
HELIPLANE
Filed July 1, 1963 5 Sheets-Sheet 5

INVENTOR.
PETER F. GIRARD
BY Knox & Knox

United States Patent Office 3,146,970
Patented Sept. 1, 1964

3,146,970
HELIPLANE
Peter F. Girard, San Diego, Calif., assignor to The Ryan Aeronautical Co., San Diego, Calif.
Filed July 1, 1963, Ser. No. 291,788
8 Claims. (Cl. 244—7)

The present invention relates to aircraft and more specifically to a heliplane.

Aircraft capable of vertical take-off and landing utilize many different means for propulsion and lift. Some types use separate lift and propulsion engines, which results in a heavy and complex aircraft. Others use deflected thrust from a jet engine or ducted fan, which involve large movable components. Helicopters are versatile in hovering and low speed maneuvering but are very limited in their maximum speed, since the lifting rotor must also provide forward thrust. In addition, the center of gravity of a helicopter is critical in tilting rotor types, and in forward flight the aircraft is usually inclined to the direction of flight, the thrust vector of the rotor being inclined to provide lift and forward thrust, which limit forward speed. Additional forward thrust means can be used but the rotor, unless made retractible by some complex means, causes considerable drag.

The primary object of this invention, therefore, is to provide an aircraft capable of vertical take-off and landing, hovering, high maneuverability at low speeds, smooth transition between vertical and horizontal flight and high speed forward flight, even at supersonic speeds, utilizing a single wing which incorporates rotor portions for vertical flight and becomes a rigid fixed wing in forward flight.

Another object of this invention is to provide an aircraft having a common power source for vertical and horizontal flight. In this respect it should be understood that the common power source could include multiple engines but the same power source drives the lifting rotor and provides propulsive thrust, without thrust deflecting means such as tiltable engines, ducts, nozzles, or the like and without change in available power.

Another object of this invention is to provide an aircraft in which the wing, when rotating, is a rigid rotor, allowing a considerable range of center of gravity location, with improved stability under varied load conditions.

Another object of this invention is to provide an aircraft in which the rotor portions of the wing operate as roll control surfaces with the wing fixed in forward flight, a single control system being used for vertical and horizontal flight operation.

Still another object of this invention is to provide an aircraft having a novel yaw control system operable by common controls in vertical and horizontal flight.

A further object of this invention is to provide an aircraft in which the wing can auto-rotate as a rotor in the event of power failure and permit safe landing, the auto-rotation of the wing also providing short take-off and landing capability in the manner of an autogiro.

Another object of this invention is to provide a heliplane in which the pilot's controls operate in the accepted manner of conventional helicopter and aircraft controls, so that no new technique is necessary to fly the aircraft.

Figure 2:
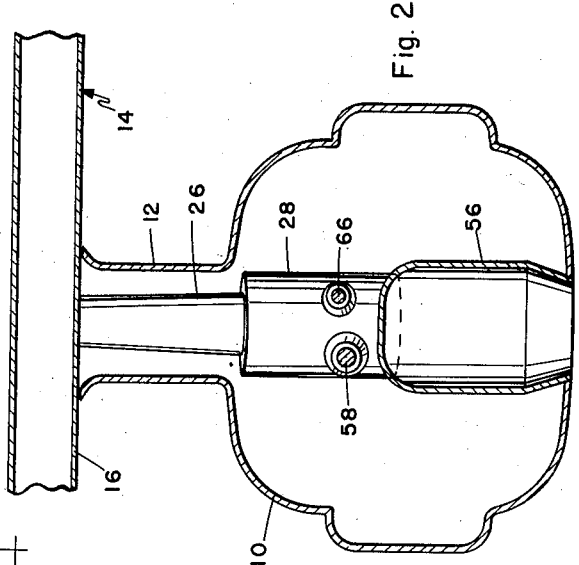
Figure 3:
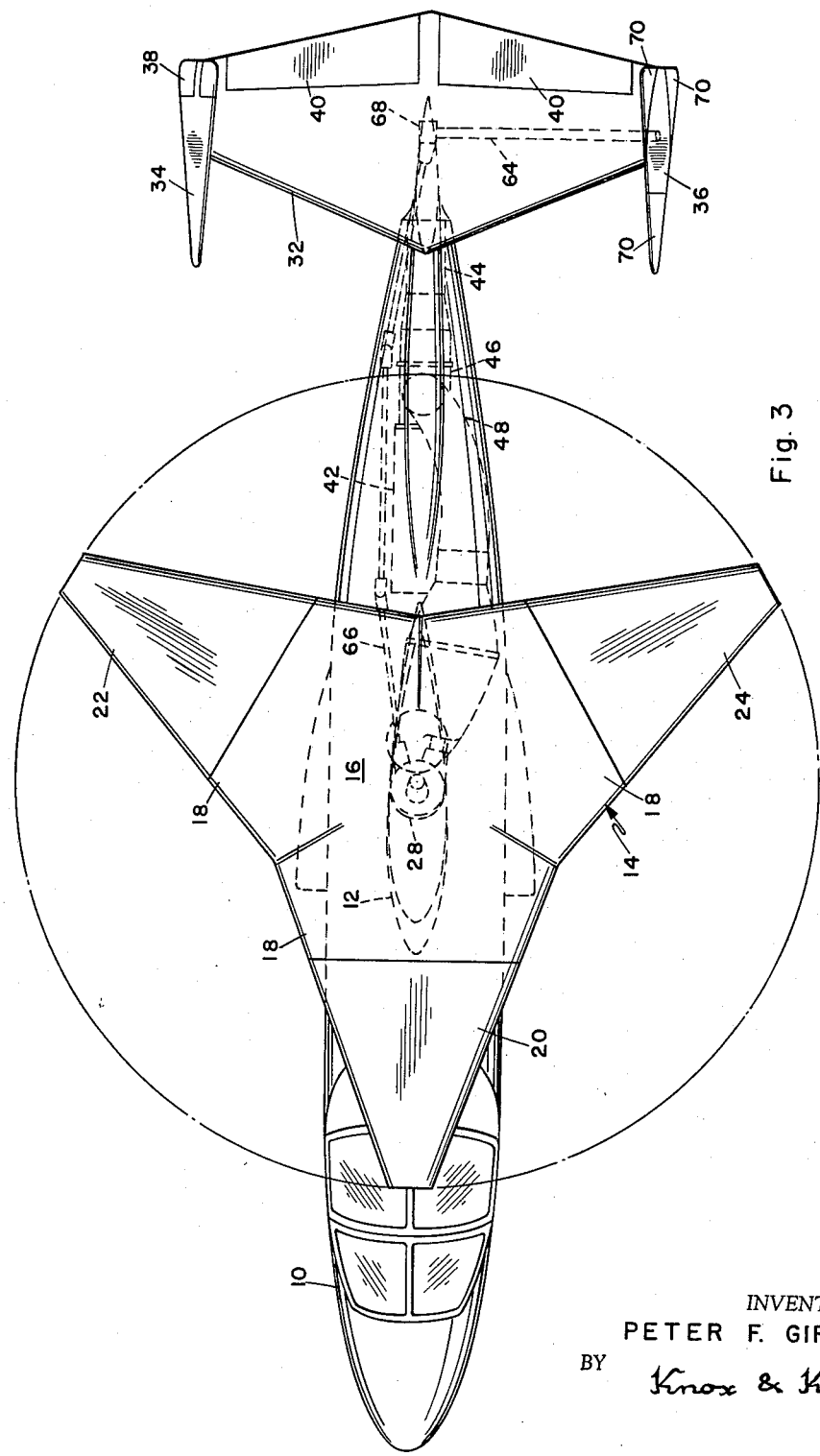
Figure 4:
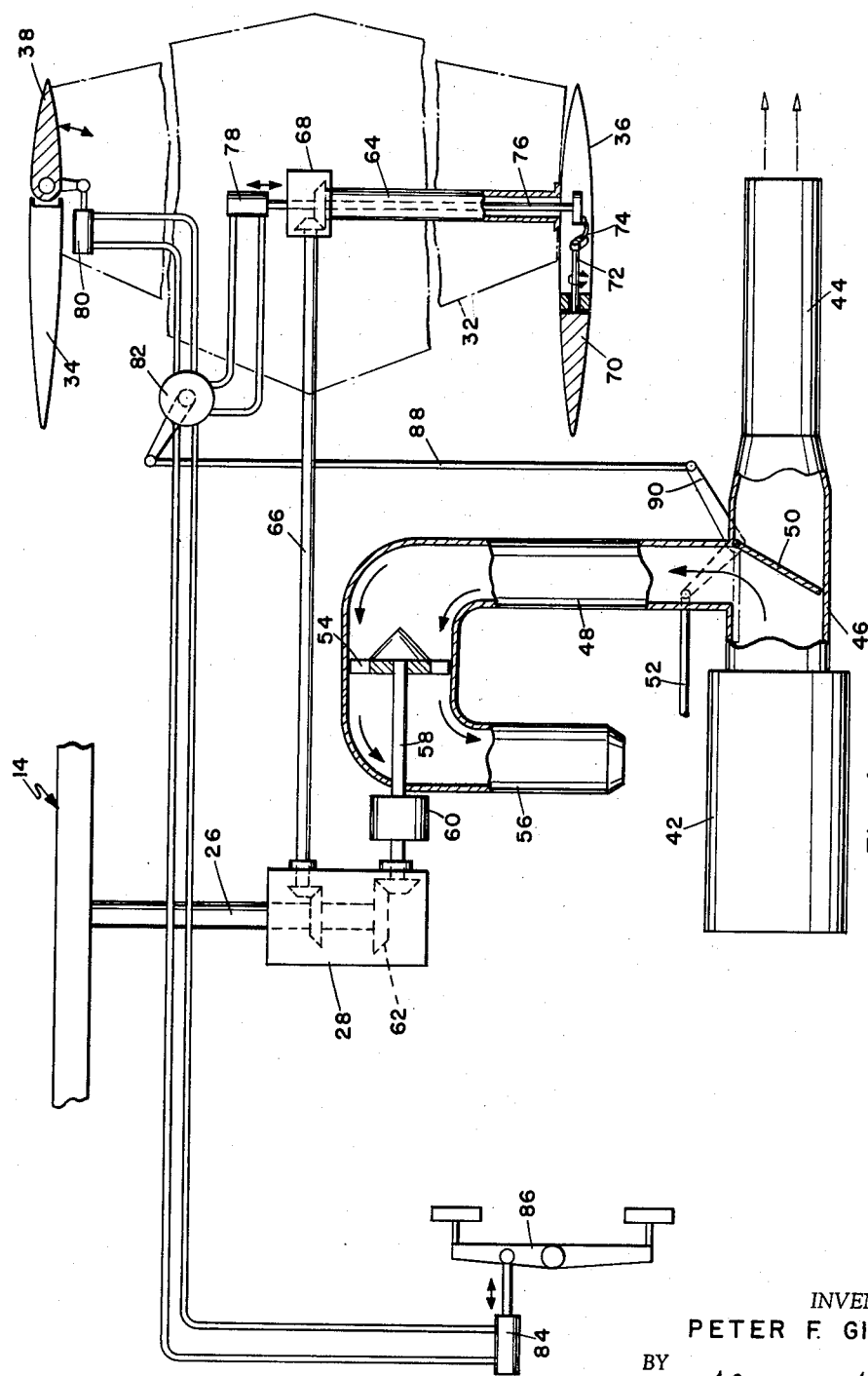
Figure 5:
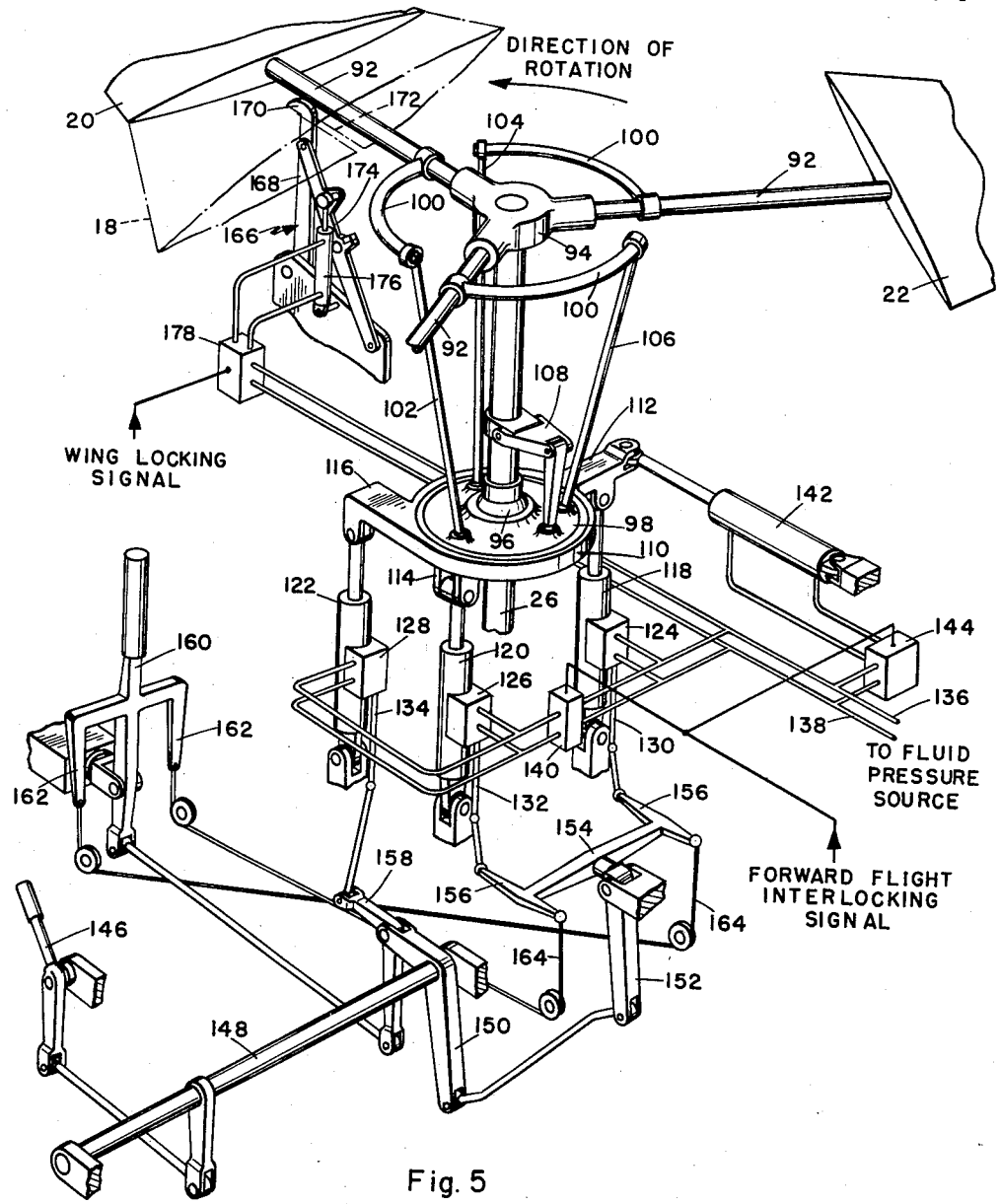
Figure 6:
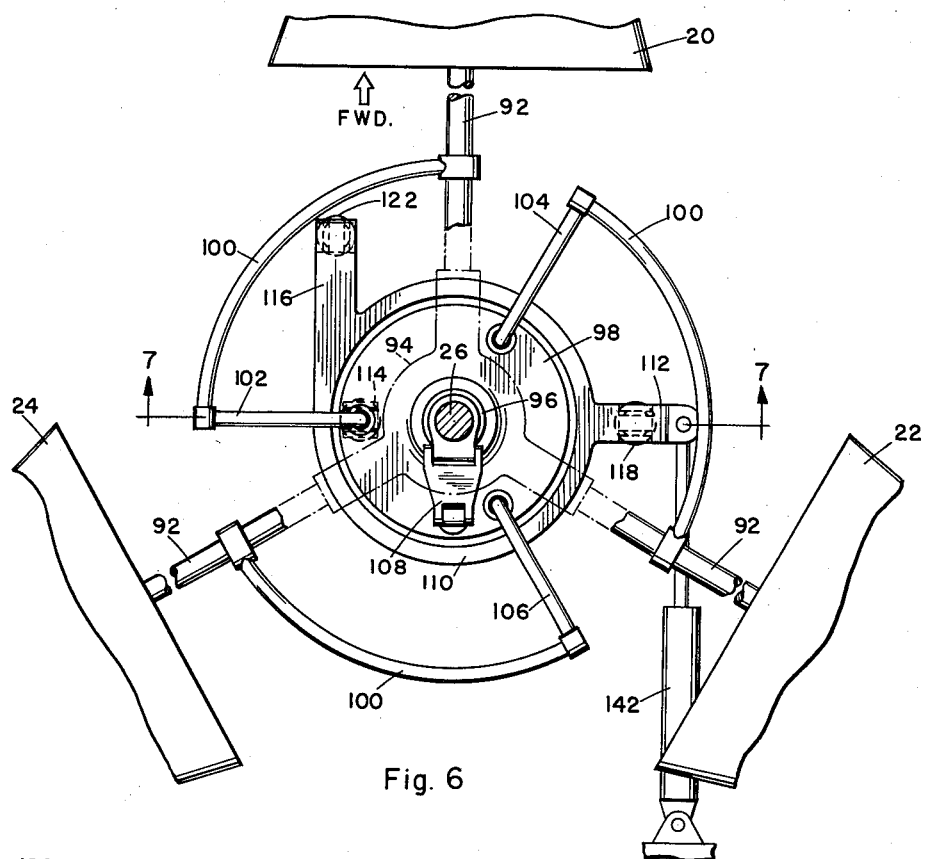
Figure 8:
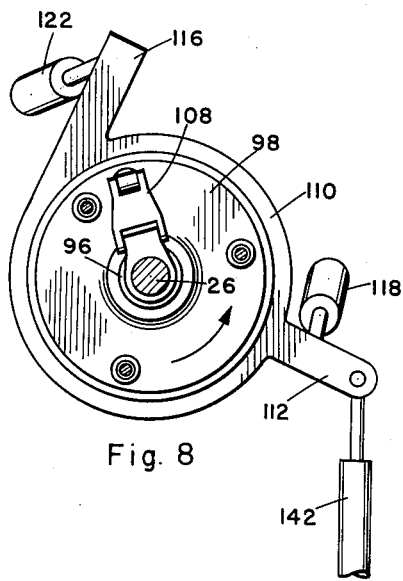
Figure 7:
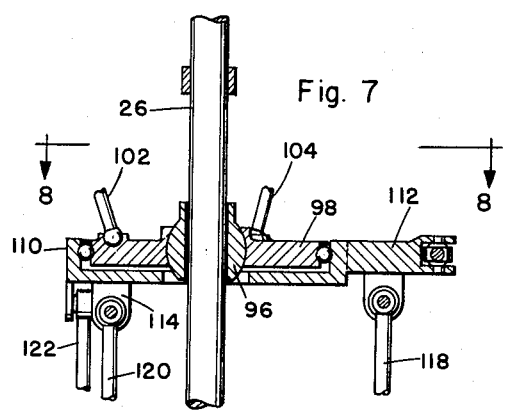

With these objects in view, the invention consists in the novel arrangement and combination of elements, as described in the specification, pointed out in the claims and illustrated in the drawings, in which:

FIGURE 1 is a side elevation view of the aircraft;
FIGURE 2 is an enlarged sectional view taken on line 2—2 of FIGURE 1;
FIGURE 3 is a top plan view of the aircraft;
FIGURE 4 is a diagram of the propulsion and yaw control systems;
FIGURE 5 is a diagrammatic perspective view of the wing and rotor control system;
FIGURE 6 is an enlarged top plan view of the rotor head mechanism in the forward flight position;
FIGURE 7 is a sectional view taken on line 7—7 of FIGURE 6; and
FIGURE 8 is a sectional view taken on line 8—8 of FIGURE 7, but with the mechanism in vertical flight position.

Similar characters of reference indicate similar or identical elements and portions throughout the specification and throughout the view of the drawing.

*General Structure*

The aircraft, as illustrated in FIGURES 1 and 3, comprises a fuselage 10 of suitable configuration, with an upright pylon 12 above the fuselage substantially at the center of gravity position. On top of the pylon 12 is a wing 14 of modified delta planform, having a center section 16 with three symmetrical arms 18 of low aspect ratio, on which are tip portions 20, 22 and 24, the radial cross section of the wing at any position being a substantially lenticular airfoil. From FIGURE 3 it will be apparent that the center section 16 is generally hexagonal in form and comprises a considerable portion of the total wing area. The wing 14 is rotatable about its center on a rotor shaft 26 extending downwardly through pylon 12 to a drive unit 28, but can be locked in fixed position with one tip forwardly, as hereinafter described in more detail. It should be understood that a wing having more than three arms could be used, but would not be as efficient in high speed flight and would be subject to considerable airflow interference between the tip portions when rotating.

At the rear of the fuselage 10 is a dorsal fin 30 supporting a tailplane 32, at the opposite ends of which are a fixed fin 34 and a rotary fin 36, said fixed fin having a movable rudder 38 in a conventional arrangement. The tailplane 32 is provided with control surfaces 40 which can function as elevons or elevators, depending on the degree of control required.

The specific proportions and configuration of the aircraft can vary considerably, according to the required performance and function, while maintaining the rotatable wing and novel tail arrangement. Any suitable landing gear can be used and has been omitted for simplicity.

*Propulsion and Yaw Control System*

The aircraft as illustrated is powered by a single turbojet engine 42 installed within fuselage 10, but it will be obvious that other types of engines may be used, either singly or in multiple, with suitable driving connections. However, to achieve the high performance of which the aircraft is capable, the turbojet is most desirable.

Normal propulsive thrust is derived from exhaust gases issuing from a conventional tailpipe 44. Between the engine 42 and tailpipe 44 is a diverter chamber 46 having a duct 48 extending from the side and containing a diverter valve 50 which can be moved by a control rod 52 to block either the duct or said tailpipe, as illustrated in FIGURE 4. Duct 48 leads to an auxiliary power turbine 54 from which a nozzle 56 extends downwardly to exhaust through the bottom of fuselage 10, as in FIGURE 2. Turbine 54 has an output shaft 58 connected through a clutch 60 to drive unit 28, in which a suitable gear assembly 62 transfers power to rotor shaft 26.

Fin 36 is of equilateral triangle shape and is rotatable about its center on a shaft 64 extending spanwise through tailplane 32, the fin being perpendicular to said tailplane. An extension shaft 66 is connected from drive unit 28 to a gear box 68 on shaft 64 to rotate fin 36 in unison with the rotor shaft 26. Fin 36 has tips 70 pivotally mounted on radial hinge rods 72 to act as variable pitch rotor blades. Each hinge rod 72 is coupled by a bellcrank 74 to a pitch control rod 76 extending coaxially through shaft 64 to a linear actuator 78, in a manner similar to a conventional variable pitch propeller.

Rudder 38 is operated in a normal manner by an actuator 80 which, together with actuator 78, is coupled through a two-way valve 82 to a control actuator 84 connected to a pilot operated rudder bar 86. For simplicity the actuators are indicated as connected in a closed fluid system, by which movements of rudder bar 86 cause corresponding movements of rudder 38 or pitch control rod 76. Other proportional control means may be equally suitable. Valve 82 is connected by a link rod 88 to an arm 90 attached to diverter valve 50. When diverter valve 50 is obstructing tailpipe 44 and drive unit 28 is in operation, valve 82 couples pitch control rod 76 to the rudder bar 86. When diverter valve 50 moves to block duct 48 for forward flight propulsion, valve 82 transfers rudder bar action to the rudder 38. If desired the rudder 38 may be left operable at all times but will be ineffective in vertical and very low speed flight.

Wing and Rotor Control System

As illustrated in FIGURES 5–7, the wing tip portions 20, 22 and 24 are pivotally mounted on radial hinge rods 92 extending from a central hub 94, which is fixed to the upper end of rotor shaft 26. Mounted on shaft 26 is a ball element 96 axially slidable on the shaft, said ball element carrying a universally pivotal swash plate 98. Each hinge rod 92 has an actuating arm 100 extending laterally in the direction of rotation of the assembly, and connecting the actuating arms to equally spaced positions on swash plate 98 are connecting rods 102, 104 and 106, with ball or universal attachments at each end for freedom of motion. The linkage is basically the type used in helicopters and is well known in principle. Swash plate 98 is coupled to rotor shaft 26 by a double hinged knuckle 108 so that the swash plate is driven in rotation with the shaft but can tilt in any direction or slide axially on the shaft on ball element 96.

Surrounding swash plate 98 is a control ring 110 comprising the outer portion of a ball or roller bearing in which the swash plate is the rotatable inner portion. Extending laterally from one side of control ring 110 is a roll control arm 112 and diametrically opposite thereto is a hinge fitting 114 on the underside of the control ring, while projecting forwardly from said control ring is a pitch control arm 116. Connected to the roll control arm 112 is a jack 118 having linear action substantially vertically, and connected to hinge fitting 114 is a similar jack 120. A further similar jack 122 is connected to pitch control arm 116. Jacks 118, 120 and 122 are provided with proportional control valves 124, 126 and 128 with control rods 130, 132 and 134, respectively, and are all connected to pressure supply lines 136 and 138 from a suitable pressure source, not shown. Fluid pressure operated jacks with proportional control valves, by which a motion of the valve control rod produces a corresponding proportional motion of the jack, are well known. Other types of proportionally movable actuators may be used. A cut-off valve 140 is installed in pressure lines 136 and 138 between the pressure source and jacks 120 and 122, so that these jacks can be disabled while leaving jack 118 operative.

A phase control jack 142 is connected to the outer end of roll control arm 112 to rotate control ring 110 through a limited angle about the axis of shaft 26, said jack being coupled to pressure supply lines 136 and 138 through a reversible control valve 144.

To accommodate all of the necessary motions of control ring 110 the end connections of jacks 118, 120, 122 and 142 are universally pivotal, various suitable connections being well known.

As illustrated in FIGURE 5, the pilot is provided with a collective pitch control 146 pivotally connected to a rocker shaft 148 having a bellcrank 150 thereon. One end of bellcrank 150 is linked to a pivoted arm 152, which carries adjacent its pivot a spider 154 comprising a generally H-shaped member pivoted at its center on an axis perpendicular to the pivotal axis of said arm, so providing a universal type mounting. Spider 154 has a pair of actuating arms 156 coupled to valve control rods 130 and 132, so that motion of both actuating arms together, as when spider 154 swings on the pivotal axis of arm 152, moves both control rods 130 and 132 to produce equal action of jacks 118 and 120. The other end of bellcrank 150 carries a secondary bellcrank 158, one end of which is coupled to control rod 134, the other end being connected to the lower end of a universally mounted control stick 160 resembling a conventional aircraft control stick. Thus when control stick 160 is moved fore and aft the secondary bellcrank 158 applies the motion to pitch control jack 122. Operation of collective pitch control 146 also operates jack 122 since the secondary bellcrank 158 is then moved with bellcrank 150 as the jacks 118 and 120 are actuated collectively. The control stick 160 has lateral arms 162 coupled by cables 164 to the actuating arms 156 of spider 154, so that lateral movements of said control stick cause lateral rocking motion of the spider and move control rods 130 and 132 oppositely. The control system as illustrated is representative of hydraulic and mechanical means and other equivalent systems may be used to obtain the necessary controlling motions of control ring 110.

Control stick 160 can also be connected to control surfaces 40 by any conventional means, not shown, for normal aerodynamic control in forward flight.

Forwardly of the shaft 26 is a wing latch assembly 166 having a latch arm 168 pivoted to swing in a generally vertical plane. At the upper end of latch arm 168 is a tongue 170 which enters a slot 172 in the lower surface of the wing 14 to lock the wing against rotation with one tip portion forwardly. The slot 172 can be in each arm 18 so that any tip can be stopped in the forward position and would, of course, be provided with suitable reinforced structure to receive the latch tongue. Latch arm 168 is operated by a hinged toggle bar 174, which is folded or extended by means of a jack 176 coupled to pressure supply lines 136 and 138 through a reversible control valve 178.

Control valve 178 is actuated by any suitable control means, either as a distinct operation or as part of a control sequence for transition between vertical and horizontal flight modes. Similarly, control valve 144 and cut-off valve 140 are actuated by an interlocking action in synchronization or in sequence with valve 178 to change the wing from vertical to forward flight operation, or vice versa. The specific means for accomplishing the transition operation may vary considerably and can be manual, automatic, or semi-automatic depending on the particular aircraft.

Operation

For take-off the diverter valve 50 is set to divert the exhaust gases from the jet engine 42 to the turbine 54, so providing power to the drive unit 28. The wing 14 is rotated by rotor shaft 26 and the fin 36 is rotated by extension shaft 66, the engine 42 operating in the vertical flight condition.

The phase control jack 142 is actuated to rotate the control ring 110 and retard the effective jack positions relative to the direction of rotation, as in FIGURE 8. This effectively advances the action of the cyclic pitch operating mechanism and is an accepted arrangement in rigid rotor type helicopter.

When collective pitch is applied by means of control 146 all of the jacks 118, 120 and 122 are operated equally through the associated linkage, causing control ring 110 and swash plate 98 to be raised in a level position, with ball element 96 sliding on the shaft 26. The connecting rods 102, 104 and 106 are thus raised and cause tip portions 20, 22 and 24 to pivot to a positive pitch angle relative to the direction of rotation, said tip portions then acting as lifting rotor blades. It should be noted that the residual thrust of the exhaust gases emerging from nozzle 56 adds to vertical lift.

The tips 70 of fin 36 are also pivoted by actuator 78, controlled by rudder bar 86, so that the rotating fin becomes an anti-torque rotor, counteracting the torque of the rotating wing now functioning as a main lifting rotor. Yaw control and directional change in vertical or hovering flight are obtained by changing the pitch of fin tips 70.

By means of collective pitch control the rate of climb and descent of the aircraft can be controlled as desired. Cyclic pitch control of the wing tip portions is provided by the control stick 160, the aircraft moving in the direction in which the stick is deflected. Flying technique is similar to that of a conventional helicopter of the rigid rotor type, the action and effects of collective and cyclic pitch control of the rotor being well known. Lateral or roll control is provided by opposite actions of jacks 118 and 120, while longitudinal or pitch control is obtained by jack 122.

In transition from vertical to horizontal flight the aircraft is moved forwardly by proper cyclic control of the wing tip portions, then the diverter valve 50 is moved gradually to allow a portion of the exhaust gases to escape from the tailpipe 44 and provide forward thrust. As forward speed increases, the central portion of the wing generates aerodynamic lift and the pitch of tip portions 20-24 is gradually decreased to zero pitch. When the diverter valve 50 closes duct 48 all of the jet engine thrust is rearwardly through tailpipe 44, the engine then being in the cruising flight condition. The aerodynamic controls are now effective and control surfaces 40 and rudder 38 control the aircraft, collective pitch control also being effective. The wing 14 and fin 36 are still rotating, although not driven, with their tips all at zero pitch and not providing any thrust, and are allowed to come to a stop. Latch assembly 166 is then actuated to lock the wing in place with one tip forward, in the manner of a fixed delta type wing. Phase control jack 142 is operated to rotate control ring 110 to the fixed wing position and valve 140 is closed to cut off jacks 120 and 122. Collective pitch control now has no effect. In fixed position the fin 36 is an aerodynamically streamlined surface and does not interfere in any way with high speed flight, as opposed to a propeller type rotor.

With the wing in fixed position, as in FIGURES 5–7, it will be noted that the connecting rod 104 and 106 are both on one side of shaft 26 with rod 102 on the other side, relative to the longitudinal axis of the aircraft. Since jack 118 is the only one operative, lateral motion of control stick 160 will cause this jack to raise or lower the roll control arm 112, the control ring 110 pivoting about the now stationary hinge fitting 114. Connecting rod 102 is directly over hinge fitting 114 and is not subjected to linear motion, the forward tip portion 20 remaining fixed. However, the connecting rods 104 and 106 are raised and lowered simultaneously and equally, their linkage to tip portions 22 and 24 causing those tip portions to pivot in opposite directions in the manner of ailerons. In cruising flight the aircraft is thus controlled in a conventional manner by aerodynamic surfaces, the same control system being used by the pilot in all phases of flight.

For landing, the transition sequence is reversed by unlatching the wing 14 and diverting jet engine exhaust gases to start rotation of the wing and fin 36. Valve 140 is opened to energize all the jacks and phase control jack 142 is operated to retard control ring 110 to rotor actuating position. As forward speed decreases and aerodynamic lift diminishes, the tip portions 20–24 are actuated to function as rotor elements. The aircraft returns to the vertical flight mode and is landed in the manner of a helicopter.

The aircraft can, of course, be operated normally with the wing fixed at all times. Also the wing can be allowed to auto-rotate in the manner of an autogiro to shorten the take-off and landing run without actually being driven. The auto-rotation feature is a useful safety factor since, in the event of engine failure, the wing can be used as an auto-rotating rotor to bring the aircraft to a safe landing.

The use of a combination wing and rotor reduces weight and drag, simplifies structure and makes the aircraft more compact. The considerable disc area swept by the rotating wing allows the aircraft to operate at a low disc loading in the vertical flight phase, while in the fixed wing position the aircraft operates at a high wing loading most efficient in high speed aircraft.

Control of the aircraft is greatly simplified by the common control system for all flight conditions. It is not necessary for the pilot to switch or transfer from one type of control action to another during transition, full control of the aircraft being continuous throughout all phases of flight.

It is understood that minor variation from the form of the invention disclosed herein may be made without departure from the spirit and scope of the invention, and that the specification and drawings are to be considered as merely illustrative rather than limiting.

I claim:
1. An aircraft, comprising:
an airframe;
a wing having a center section and at least three radially extending arms;
said wing being mounted on said airframe for rotation about an axis perpendicular to the center of symmetry of the wing;
a source of power connected to rotate said wing;
the tip portions of said arms being pivotally mounted on substantially radial axes for inclination relative to the chord plane of the wing and comprising lifting rotor portions;
pitch, roll and collective control means operatively connected to said tip portions to vary the inclination thereof cyclically and collectively as said wing rotates;
locking means to hold said wing stationary with one of said arms extending forwardly on the aircraft; said control means including means connected to the tip portions extending laterally of the aircraft when said wing is stationary to incline those tip portions in opposite directions of inclination in response to control movements of said roll control means.

2. An aircraft, comprising:
an airframe;
a wing having a center section and at least three radially extending arms;
said wing being mounted on said airframe for rotation about an axis perpendicular to the center of symmetry of the wing;
a source of power connected to rotate said wing;
the tip portions of said arms being pivotally mounted on substantially radial axes for inclination relative to the chord plane of the wing and comprising lifting rotor portions;
control means operatively connected to said tip portions to vary the inclination thereof cyclically and collectively as said wing rotates;
locking means to hold said wing stationary with one of said arms extending forwardly on the aircraft; said control means including means connected to the tip portions extending laterally of the aircraft when said wing is stationary to incline those tip portions in opposite directions of inclination in response to control movements;

said tail assembly including a fin mounted for rotation about an axis extending laterally from the aircraft and substantially perpendicular to the rotational axis of said wing;

said fin having tip portions pivotally mounted on radial axes and constituting anti-torque rotor portions;

means connected to said fin tip portions for collective pivotal motion thereof;

said fin being connected to and driven by said source of power.

3. An aircraft, comprising:

an airframe;

a wing having a center section and three radially extending arms;

said wing being mounted on said airframe for rotation about an axis perpendicular to the center of symmetry of the wing;

the tip portions of said arms being pivotally mounted on substantially radial axes for inclination relative to the chord plane of the wing and comprising lifting rotor portions;

primary control means operatively connected to said tip portions to vary the inclination thereof cyclically and collectively as said wing rotates;

a tail assembly mounted on said airframe; said tail assembly including a fixed fin having a rudder pivotally attached thereto, and a rotating fin mounted for rotation about an axis extending laterally from the aircraft and substantially perpendicular to the rotational axis of said wing;

said rotating fin having tip portions pivotally mounted on radial axes and constituting antitorque rotor portions;

yaw control means connected to said fin tip portions for collective pivotal motion thereof;

and an engine operatively connected to drive said wing and said rotary fin.

4. An aircraft according to claim 3 wherein said engine is operable selectively between a vertical flight position driving said wing and said rotary fin, and a cruising position providing propulsive thrust for the aircraft;

said yaw control means being coupled to said rudder;

and means connected to said engine to transfer the yaw control action from said rotary fin tips to said rudder as the engine changes from vertical flight position to cruising position.

5. An aircraft, comprising:

an airframe;

a wing having a center section and three radially extending arms;

said wing being mounted on said airframe for rotation about an axis perpendicular to the center of symmetry of the wing;

the tip portions of said arms being pivotally mounted on substantially radial axes for inclination relative to the chord plane of the wing and comprising lifting rotor portions;

pitch, roll and collective control means operatively connected to said tip portions to vary the inclination thereof cyclically and collectively as said wing rotates;

locking means to hold said wing stationary with one of said arms extending forwardly on the aircraft and the other arms on opposite sides thereof;

said roll control means being further connected to the tip portions of said other arms to move the same in opposite directions when said wing is stationary;

an engine operatively connected to rotate said wing;

and means to disconnect said engine from said wing when the wing is stationary.

6. An aircraft according to claim 5, wherein said control means comprises:

a swash plate mounted for universal pivotal motion about the axis of rotation of said wing;

lateral control actuators connected to opposite sides of said swash plate;

said tip portions being coupled to said swash plate so that, when said wing is stationary, both of the laterally disposed tip portions are coupled to the same side of said swash plate;

and means operable together with said wing locking means to shut off the said actuator on the other side of said swash plate, whereby only the actuator on said one side is operable to control the tip portions.

7. An aircraft, comprising:

an airframe;

a wing having a center section and at least three radially extending arms;

said wing being mounted on said airframe for rotation about an axis perpendicular to the center of symmetry of the wing;

a source of power connected to rotate said wing;

the tip portions of said arms being pivotally mounted on substantially radial axes for inclination relative to the chord plane of the wing and comprising lifting rotor portions;

control means operatively connected to said tip portions to vary the inclination thereof cyclically and collectively as said wing rotates;

locking means to hold said wing stationary and disposed with one tip portion thereof vertically aligned with the longitudinal axis of the airframe;

said airframe having a tail assembly with anti-torque means operatively mounted thereon.

8. An aircraft according to claim 7, wherein said anti-torque means comprises a substantially streamlined fin disposed in a plane parallel to the longitudinal axis of the airframe and being mounted for rotation about an axis perpendicular to said longitudinal axis;

said fin having tip portions pivotally mounted for inclination relative to the plane of the fin and consituting anti-torque rotor elements.

References Cited in the file of this patent

UNITED STATES PATENTS 2,899,149     Brequet _____ Aug. 11, 1959
3,025,022     Girard _____ Mar. 13, 1962